United States Patent [19]

Meixner et al.

[11] Patent Number: 5,189,133

[45] Date of Patent: Feb. 23, 1993

[54] HYDROPHYLIC, OLEFINICALLY UNSATURATED POLYURETHANES AND THEIR USE AS REACTIVE EMULSIFIERS

[75] Inventors: Jürgen Meixner, Krefeld; Wolfgang Kremer, Kerken, both of Fed. Rep. of Germany

[73] Assignee: Bayer Aktiengesellschaft, Leverkusen, Fed. Rep. of Germany

[21] Appl. No.: 839,454

[22] Filed: Feb. 20, 1992

[30] Foreign Application Priority Data

Feb. 27, 1991 [DE] Fed. Rep. of Germany ....... 4106121

[51] Int. Cl.$^5$ .............................................. C08G 18/30
[52] U.S. Cl. ....................................... 528/49; 528/904
[58] Field of Search .................................. 528/49, 904

[56] References Cited

U.S. PATENT DOCUMENTS

| 4,070,323 | 1/1978 | Vanderhoff et al. | 260/29.6 NR |
| 4,339,566 | 7/1982 | Rosenkranz et al. | 528/68 |
| 5,089,586 | 2/1992 | Piepho et al. | 528/49 |

FOREIGN PATENT DOCUMENTS

| 2007097 | 7/1990 | Canada . |
| 098752 | 1/1984 | European Pat. Off. . |
| 3829588 | 3/1990 | Fed. Rep. of Germany . |

*Primary Examiner*—Maurice J. Welsh
*Attorney, Agent, or Firm*—Joseph C. Gil; Thomas W. Roy

[57] ABSTRACT

The present invention relates to hydrophilic polyurethanes having a content of (i) olefinic double bonds (expressed as C=C, molecular weight 24) of at least 1.0% by weight and (ii) ethylene oxide units incorporated through polyethylene glycol of 20 to 80% by weight, which are based on the reaction product of a) 1.0 mole of a polyisocyanate component consisting of at least one organic polyisocyanate with b) 0.3 to 2.5 moles of at least one $\beta,\gamma$-ethylenically unsaturated ether alcohol containing 5 to 29 carbon atoms, c) 0 to 1.0 mole of at least one synthesis component containing at least two isocyanate-reactive groups and having a molecular weight of 62 to 2,000 and d) 0.25 to 0.85 moles of a polyethylene glycol component containing at least one polyethylene glycol having a molecular weight of 1,300 to 5,000, at an NCO/OH equivalent ratio, based on starting components a) to d), of 0.7:1 to 1.2:1.

The present invention also relates to a water-dispersible coating composition based on a mixture of radical-curable synthetic resins containing unsaturated groups wherein the mixture contains A) 50 to 95 parts by weight of at least one non-water-dispersible synthetic resin containing unsaturated groups and having a molecular weight ($M_n$ of 500 to 10,000 and B) 5 to 95 parts by weight of a polyurethane component which possesses sufficient hydrophilicity to ensure the dispersibility of the mixture in water and which contains at least one of the previously mentioned hydrophilic polyurethanes.

4 Claims, No Drawings

HYDROPHYLIC, OLEFINICALLY UNSATURATED POLYURETHANES AND THEIR USE AS REACTIVE EMULSIFIERS

BACKGROUND OF THE INVENTION

1. Field of the Invention

This invention relates to new, nonionically hydrophilically modified, olefinically unsaturated polyurethanes and to a water-dispersible coating composition based on a mixture of synthetic resins having unsaturated groups which contains the nonionically hydrophilic polyurethanes as emulsifier.

2. Description of the Prior Art

Water-dispersible polyurethanes containing double bonds are known and described in EPA 0,098,752 and DE-OS 2,936,039. The hydrophilicity of these known systems is based on the presence of ionic centers, generally carboxylate or sulfonate groups, containing as counterions either alkali metal cations or ammonium ions which remain in the coatings ultimately obtained from the systems and seriously affect their water resistance. In addition, the amines often present can cause yellowing of the lacquer coatings while any auxiliary solvents present can have an environment-polluting effect during the drying process.

DE-OS 3,829,588 describes water-dispersible allyl urethanes which may also contain unsaturated dicarboxylic acid units. Dispersibility in water is achieved through the s incorporation of a special combination of polyethylene glycols. However, the relatively high content of polyethylene glycols leads to binders with unsatisfactory lacquer film properties.

Another method of obtaining water-dilutable products is to use external emulsifiers. Thus, according to U.S. Pat. No. 4,070,323 for example, acryloyl-functional polyurethanes are dispersed in water by means of anionic or cationic oil-in-water emulsifiers (for example sodium lauryl sulfate). These emulsifiers are not incorporated in the lacquer film during the radical crosslinking reaction. This considerably reduces the degree of water resistance of the lacquer films which could otherwise be achieved.

DE-OS 3,900,257 describes nonionically hydrophilic polyurethanes containing (meth)acryloyl groups and their use as reactive emulsifiers for nonwater-dispersible urethane (meth)acrylates. However, only a limited number of synthetic resins can be emulsified with these emulsifiers. For example, they are unable to emulsify styrene-free, unsaturated polyester resins.

Accordingly, an object of the present invention is to disperse radical-curable synthetic resins, more particularly unsaturated polyester resins, in water without incurring any of the disadvantages of the prior art.

This object may be achieved with the hydrophilic polyurethanes according to the invention which are described in more detail hereinafter and by their use in accordance with the invention which is also described in more detail hereinafter.

SUMMARY OF THE INVENTION

The present invention relates to hydrophilic polyurethanes having a content of (i) olefinic double bonds (expressed as C=C, molecular weight=24) of at least 1.0% by weight and (ii) ethylene oxide units incorporated through polyethylene glycol of 20 to 80% by weight, which are based on the reaction product of a) 1.0 mole of a polyisocyanate component containing at least one organic polyisocyanate with
b) 0.3 to 2.5 moles of at least one $\beta,\gamma$-ethylenically unsaturated ether alcohol containing 5 to 29 carbon atoms,
c) 0 to 1.0 mole of at least one synthesis component containing at least two isocyanate-reactive groups and having a molecular weight of 62 to 2,000 and
d) 0.25 to 0.85 moles of a polyethylene glycol component containing at least one polyethylene glycol having a molecular weight of 1,300 to 5,000, at an NCO/OH equivalent ratio, based on starting components a) to d), of 0.7:1 to 1.2:1.

The present invention also relates to a water-dispersible coating composition based on a mixture of radical-curable synthetic resins containing unsaturated groups wherein the mixture contains A) 50 to 95 parts by weight of at least one non-water-dispersible synthetic resin containing unsaturated groups and having a molecular weight ($M_n$) of 500 to 10,000 and
B) 5 to 95 parts by weight of a polyurethane component which possesses sufficient hydrophilicity to ensure the dispersibility of the mixture in water and which contains at least one of the previously mentioned hydrophilic polyurethanes.

DETAILED DESCRIPTION OF THE INVENTION

The polyurethanes according to the invention are based on reaction products of the above-mentioned starting components a) to d). Preferably 0.7 to 2.0 moles of component b), 0.03 to 0.1 moles of component c) and 0.3 to 0.6 moles of component d) are used for each mole component a) in the production of the polyurethanes.

Component a) contains at least one organic polyisocyanate. Suitable polyisocyanates include any organic polyisocyanates known from polyurethane chemistry which contain aliphatically, cycloaliphatically and/or aromatically bound isocyanate groups and which have a molecular weight of 168 to 1,000, preferably 168 to 300. Suitable organic polyisocyanates include 1,6-diisocyanatohexane (HDI), 1-isocyanato-3,3,5-trimethyl-5-isocyanatomethyl cyclohexane (IPDI), 4,4'-diisocyanatodicyclohexylmethane, 4,4'-diisocyanatodiphenyl methane, commercial mixtures thereof with 2,4-diisocyanato-diphenyl methane and optionally the higher homologs of these diisocyanates, 2,4-diisocyanatotoluene and commercial mixtures thereof with 2,6-diisocyanatotoluene. Monomeric diisocyanates of the type mentioned by way of example are preferred as component a), although polyisocyanates of higher functionality (such as biuret-, isocyanurate- or urethane-modified polyisocyanates based on the previously mentioned diisocyanates) are also suitable. These derivatives generally have a molecular weight of up to 1,000.

The preparation of such derivatives is described, for example, in U.S. Pat. No. 3,124,605, U.S. Pat. No. 3,183,112, U.S. Pat. No. 3,919,218 or U.S. Pat. No. 4,324,879, the disclosures of which are herein incorporated by reference.

In addition to at least one alcoholic hydroxyl group, the $\beta,\gamma$-ethylenically unsaturated ether alcohols b) contain from 5 to 29, preferably from 5 to 14 carbon atoms and at least one and preferably at least two $\beta,\gamma$-ethylenically unsaturated ether units corresponding to the following formula

In this formula R stands for hydrogen or a saturated or unsaturated alkyl radical having from 1 to 5 carbon atoms. Examples of such ether alcohols include glycerol diallyl ether, trimethylol propane diallyl ether, pentaerythritol triallyl ether, ethylene glycol octadienyl-(2,7)-ether, trimethylol propane dioctadienyl-(2,7)-ether and pentaerythritol trioctadientyl-(2,7)-ether. Trimethylol propane diallyl ether is preferred.

The synthesis components c) include simple monohydric alcohols having a molecular weight of 62 to 400, such as ethylene glycol, propylene glycol, the isomeric butanediols or hexanediols, glycerol, trimethylol propane, pentaerythritol, diethylene glycol, triethylene glycol and dipropylene glycol; the relatively high molecular weight polyether polyols known from polyurethane chemistry which have a molecular weight of 400 to 2,000, preferably 400 to 1,000, and may be obtained by the alkoxylation of simple alcohols of the type previously mentioned; and the polyester polyols which are known from polyurethane chemistry, have similar molecular weights to the polyether polyols and may be obtained by the reaction of an excess of the polyhydric alcohols previously mentioned with polybasic acids or anhydrides of polybasic acids such as adipic acid, phthalic acid, phthalic anhydride, maleic acid, maleic anhydride, tetrahydrophthalic acid and tetrahydrophthalic anhydride.

Component d) is a linear polyether glycol which has a number average molecular weight of 1,300 to 5,000, preferably 1,500 to 4,000, wherein at least 80 mole-%, preferably 100 mole-% of the alkylene oxide units are ethylene oxide units.

Accordingly, the expression "polyethylene glycols" is understood to encompass not only polyethylene glycols wherein the alkylene oxide units are all ethylene oxide units, but also polyalkylene glycols in which at least 80 mole-%, of the alkylene oxide units are ethylene oxide units. "Mixed" polyalkylene glycols such as these may be formed by alkoxylating suitable difunctional starter molecules (such as for example water, ethylene glycol or propylene glycol) with s mixtures of different alkylene oxides, for example ethylene oxide and propylene oxide, in a molar ratio of at least 8:2. However, component d) preferably contains pure polyethylene glycols.

The production of the hydrophilic polyurethanes according to the invention by reaction of the above-mentioned starting components may be carried out in the absence or in the presence of solvents inert to isocyanate groups (such as acetone, methyl ethyl ketone, ethyl acetate, butyl acetate, toluene and mixtures of such solvents), preferably at reaction temperatures of 20° to 200° C., more preferably 50° to 150° C.

The reaction between component a) and component b) is carried out first and is followed by reaction of the resulting reaction product with components c) and d) in any order.

Accordingly, it is possible to initially introduce the polyisocyanate and react it with the unsaturated monoalcohol b) at a temperature within the above-mentioned range, followed by reaction with component c) and then with component d) at a temperature within the above-mentioned range until the NCO content has fallen to below 0.1% by weight.

The type and quantitative ratios of the starting components are selected within the ranges mentioned to provide an NCO:OH equivalent ratio, based on components a) to d), of 0.7:1 to 1.2:1.

The urethane-forming reactions may be catalyzed in known manner, for example, with tin octoate, dibutyl tin dilaurate or tertiary amines. In addition, the polyurethane may be protected against premature and unwanted polymerization by addition of suitable inhibitors and antioxidants, each in a quantity of 0.001 to 0.3% by weight, based on the mixture as a whole.

The hydrophilic polyurethanes containing unsaturated groups have a number average molecular weight ($M_n$, as determined by gel permeation chromatography using polystyrene as standard) of 1000 to 15,000, preferably 2,000 to 10,000; a content of olefinic double bonds (expressed as C=C, molecular weight=24) of at least 1.0% by weight, preferably 1.5 to 6.0% by weight; and a content of ethylene oxide units ($-CH_2-CH_2-O-$) incorporated through polyethylene glycol of 20 to 80% by weight, preferably 30 to 75% by weight.

The hydrophilic polyurethanes are valuable emulsifiers for o hydrophobic, non-water-dispersible, radical-crosslinkable synthetic resins. These synthetic resins have a molecular weight Mn (as determined by gel permeation chromatography using polystyrene as standard) of 500 to 10,000 and preferably 500 to 5,000.

The synthetic resins which represent component A) of the mixtures according to the invention are preferably polyester resins based on the polycondensation products of certain acid and alcohol components. The acid component contains at least one $\alpha,\beta$-ethylenically unsaturated dicarboxylic acid, preferably containing 4 or 5 carbon atoms, or ester-forming derivatives (for example anhydrides) thereof, optionally in admixture with up to 200 mole-%, based on the unsaturated acid component, of one or more aliphatic saturated dicarboxylic acids containing 4 to 10 carbon atoms or cycloaliphatic or aromatic dicarboxylic o acids containing 8 to 10 carbon atoms or ester-forming derivatives (for example anhydrides) thereof. The alcohol component contains at least one monohydric or polyhydric, olefinically unsaturated ether alcohol which has been obtained by the partial etherification of the hydroxyl groups of trifunctional or higher functionality hydroxyl compounds containing 3 to 8 carbon atoms with $\beta,\gamma$-ethylenically unsaturated alcohols. Optionally one or more dihydric alcohols containing 2 to 8 carbon atoms and/or one or more monohydric alcohols containing 1 to 18 carbon atoms (i.e. polyesters of the type described, for example, in DE-A-1,024,654, DE-PS 2,221,335 and in Wagner/Sarx, "Lackkunstharze", 5th Edition, Carl Hanser Verlag, Munchen' 1971, pages 139-130) may also be included in the alcohol component.

Examples of preferred unsaturated dicarboxylic acids or derivatives include maleic acid, maleic anhydride and fumaric acid. In addition, mesaconic acid, citraconic acid, itaconic acid and chloromaleic acid may also be used.

Examples of the aliphatic, saturated and cycloaliphatic and aromatic dicarboxylic acids or derivatives include phthalic acid and phthalic anhydride; isophthalic acid; terephthalic acid; hexahydrophthalic and tetrahydrophthalic acid and their anhydrides; endomethylene tetrahydrophthalic acid and anhydride; succinic acid, succinic anhydride and succinic acid esters and chlorides; adipic acid; and sebacic acid. To produce flame-resistant polyesters, hexachloroendomethylene tetrahydrophthalic acid, tetrachlorophthalic acid and tetrabromophthalic acid may be used.

Suitable, olefinically unsaturated ether alcohols include trimethylol propane mono- and diallyl ether, glycerol mono- and diallyl ether and pentaerythritol mono-, di- and triallyl ether. Suitable dihydric alcohols include ethylene glycol, propane-1,2-diol, propane-1,3-diol, diethylene glycol, dipropylene glycol, butane-1,3-diol, butane-1,4-diol, neopentyl glycol, hexane-1,6-diol, 2,2-bis-(4-hydroxycyclohexyl)-propane and bis-alkoxylated bisphenol A. Suitable monohydric alcohols include (cyclo)aliphatic monohydric alcohols containing 6 to 18 carbon atoms such as n-hexanol, n-octanol, n-decanol, lauryl alcohol, stearyl alcohol, hexahydrobenzyl alcohol and, preferably, branched alkanols such as 2-ethyl-1-hexanol and the isomeric branched nonanols.

Mixtures of the acid components (i) and/or mixtures of the alcohol components (ii) may be used in the production of the polyesters. The type and quantitative ratios of the starting materials are selected so that the polyesters have acid values of 1 to 40, preferably 10 to 30; hydroxyl values of 10 to 100, preferably 20 to 50; and a content of allyl ether groups (expressed as $C_3H_5O$, molecular weight=57) of at least 4% by weight, preferably at least 8% by weight.

In the water-dispersible mixtures according to the invention, 50 to 95 parts by weight, preferably 70 to 93 parts by weight of the hydrophobic synthetic resins are present in admixture with 5 to 50 parts, preferably 7 to 30 parts by weight, of the hydrophilic polyurethanes which act as emulsifiers. However, it is important to select the type and quantities of the individual components within the limits stated above so that the total content of ethylene oxide units emanating from component d) in the water-dispersible mixtures is at most 20% by weight, preferably at most 15% by weight.

The mixtures may be prepared by mixing the individual components, optionally in the presence of inert solvents previously mentioned.

To prepare the water-based coating compositions according to the invention, the mixtures according to the invention are dispersed in water which may be done, for example, by stirring water into the mixture of the synthetic resins using known dissolvers.

To form a fine-particle emulsion, it is of advantage to add water in portions at temperatures below 40° C. Stable oil-in-water emulsions may be obtained in this way.

The aqueous dispersions obtained are valuable water-based binders for coating compositions. They may be used as such or in combination with known lacquer additives and auxiliaries such as fillers, pigments, solvents, flow control agents and the like for the production of coatings on any substrate.

Suitable substrates include paper, cardboard, leather, wood, plastics, nonwovens, films, textiles, ceramic materials, mineral materials, glass, metal, artificial leather and photographic materials such as paper coated with a photographic layer.

The coating compositions may be applied in known manner by spray coating, knife coating, roll coating, spread coating, dip coating or casting. After evaporation of the water and any inert solvents used, the coatings may be crosslinked either by exposure to high-energy radiation (such as UV light, electron beams or gamma beams) or by curing with metal salts of siccative acids and (hydro)peroxides at temperatures between room temperature and 250° C.

When the coatings are crosslinked by UV irradiation, photoinitiators are added to the coating compositions. Suitable photoinitiators are known and include the compounds described in Houben Weyl, Methoden der organischen Chemie, Vol. E 20, pages 80 et seq, Georg Thieme Verlag, Stuttgart 1987.

Suitable photoinitiators include benzoin ethers such as benzoin isopropyl ether, benzil ketals such as benzil dimethyl ketal, and hydroxyalkyl phenones such as 2-hydroxy-2-methyl-1-phenyl-propan-1-one.

The photoinitiators are used in quantities of 0.1 to 10% by weight, preferably 0.1 to 5% by weight (based on the weight of the dispersed hydrophilic and hydrophobic resins), depending upon the intended application for the coating compositions. The photoinitiators may be used either individually or in combination with one another to obtain advantageous synergistic effects.

The metal salts of siccative acids used when crosslinking is carried out with peroxides include cobalt, lead and manganese salts of acids such as linseed oil fatty acids, tall oil fatty acids, soybean oil fatty acids, resinic acids, such as abietic acid and naphthenic acid, acetic acid and isooctanoic acid. The acids are used in quantities such that the metal content, based on the weight of the dispersed hydrophilic and hydrophobic synthetic resins, is 0.005 to 1% by weight.

Examples of (hydro)peroxides include hydrogen peroxide, di-tert. butyl peroxide, benzoyl peroxide, cyclohexanone peroxide, methyl ethyl ketone peroxide, acetyl acetone peroxide, dinonyl peroxide, bis-(4-tert.-butylcyclohexyl)peroxydicarbonate, tert. butyl hydroxide, cumene hydroperoxide, 2,5-dimethylhexane-2,5-hydroperoxide and diisopropyl benzene monohydroperoxide. These (hydro)peroxides are preferably used in quantities of 1 to 10% by weight, based on the weight of the dispersed hydrophilic and hydrophobic synthetic resins.

In the following examples, all parts and percentages are by weight unless otherwise indicated.

EXAMPLES

Hydrophobic unsaturated polyester resin A1

90% solution in butyl acetate of a commercially available unsaturated polyester having an acid value of 25, an OH value of 75 and a viscosity (23° C.) of 30,000 mPa.s, prepared from 1 mole of maleic anhydride, 0.85 moles of ethylene glycol, 0.15 moles of propylene glycol and 0.3 moles of trimethylol propane diallyl ether.

Hydrophilic polyurethanes B

The quantity of component a) shown in Table I was dissolved in butyl acetate together with 0.025% (based on the total weighed amount) of dibutyl tin dilaurate and 0.5% (based on the total weighed amount) of 2,6-di-t-butyl-p-cresol and the resulting solution was heated to 50° C. while nitrogen was passed through the solution. The quantity of component b) (trimethylol propane diallyl ether) shown in Table 1 was then added, followed by the indicated quantity of component c) and then the total quantity of component d), in each case with stirring. The mixture was then stirred at approximately 60° C. until the NCO content had fallen to below 0.1% by weight. Colorless to light yellow, clear, highly viscous liquids were formed, which subsequently crystallized.

TABLE 1

| Starting materials (moles) | B1 | B2 | B3 | B4 |
|---|---|---|---|---|
| Component a) | | | | |
| Isophorone diisocyanate | 1.0 | — | 1.0 | 1.0 |
| Hexamethylene diisocyanate | — | 1.0 | — | — |
| Component b) | | | | |
| Trimethylol propane diallyl ether | 0.8 | 0.74 | 0.75 | 0.8 |
| Component c) | | | | |
| Trimethylol propane | 0.05 | 0.07 | — | 0.05 |
| pentaerythritol | — | — | 0.05 | — |
| Component d) | | | | |
| Polyethylene glycol (MW 1,500) | 0.46 | 0.46 | 0.46 | — |
| Polyethylene glycol (MW 2,000) | — | — | — | 0.46 |
| Solids content (%) | 80 | 60 | 80 | 80 |
| Ethylene oxide content, based on solids (%) | 59.4 | 63.0 | 60.1 | 67.5 |
| Olefinic double bonds (MW = 24), based on solids (%) | 3.5 | 3.4 | 3.3 | 2.9 |

Application Example I

To prepare the emulsions, the quantities set forth in Table 2 of hydrophobic synthetic resin A1 and hydrophilic polyurethanes B were mixed, sheared for 2 minutes with 20 g water in a dissolver at 8,000 r.p.m. and subsequently adjusted to a solids content of 50% by addition of water with stirring (1,000 r.p.m.). Stable, fine-particle, oil-in-water emulsions were formed.

TABLE 2

| Components (g) | 1 | 2 | 3 | 4 |
|---|---|---|---|---|
| A1 | 41.7 | 39.5 | 41.7 | 41.7 |
| B1 | 8.3 | | | |
| B2 | | 10.5 | | |
| B3 | | | 8.3 | |
| B4 | | | | 8.3 |
| Ethylene oxide units, % by weight, based on solids: | 8.9 | 9.5 | 9.0 | 10.1 |

Comparison Examples

Comparison Example 1

To show that the molecular weight of the polyethylene glycol used was crucial for producing the desired emulsifier effect, polyurethane B1 was prepared with a polyethylene glycol which did not correspond to the invention:

The method used to prepare polyurethane B1 was repeated with the exception that a polyethylene glycol having a molecular weight of 1,000 was used instead of a polyethylene glycol having a molecular weight of 1,500.

A highly viscous product was formed. When this product was mixed with the unsaturated polyester resin A1 and sheared with water in a dissolver using the amounts set forth in Example 1, a coarse-particle emulsion was formed, separating immediately into an organic phase and an aqueous phase.

The same result was obtained when the amount of the polyurethane of Comparison Example 1 was increased such that the mixture obtained had exactly the same ethylene oxide content as the mixture of Example 1.

Comparison Example 2

To demonstrate the ineffectiveness of the reactive emulsifiers of DE-OS 3,900,257 in emulsifying unsaturated polyester resins, the emulsifier resin referred to there as polyurethane resin B1 was reproduced (i.e., 1.0 mole of isophorone diisocyanate, 1.0 mole of hydroxyethyl acrylate, 0.5 moles of polyethylene glycol (MW 1,550), 90% in butyl acetate).

When this product was mixed with the unsaturated polyester resin A1 and sheared with water in a dissolver as in Example 1, an emulsion was formed, but immediately separated into an organic phase and an aqueous phase.

Application Example II

(a) Peroxide curing

2% by weight of an aqueous cobalt acetate solution (5% by weight metal content) and 3% by weight of hydrogen peroxide (30% aqueous solution) were added to the aqueous emulsions of Examples of 1 to 4 which were then coated onto glass plates (wet film thickness 90 μm).

The lacquer films were heated at 50° C. until they were tack-free (20 minutes) and were then stored at room temperature.

After 24 hours, the lacquer films were scratch-resistant and had a hardness (Konig pendulum damping, DIN 53 157) of more o than 100 s. The test for water and solvent resistance was carried out after storage for 1 week at room temperature. In this test the films were wetted for 1 hour with a 1:1 mixture of ethanol and water
for 2 minutes with ethyl acetate
for 2 minutes with acetone
for 16 hours with water The film showed no signs of change through staining, softening or separation from the substrate.

(b) Photochemical curing

Quantities of 4% by weight of photoinitiator (2-hydroxy-2-methyl-1-phenylpropanlone) were added to Examples 1 to 4 before emulsification. After emulsification, the products were coated onto glass plates (wet film thickness 90 μm) and, after evaporation of the water (6 minutes at 50° C.), were moved past two overhead high-pressure UV lamps (80 W/cm, distance 10 cm) at a speed of 5 m/minute.

Scratch-resistant, water-resistant and solvent-resistant coatings with hardness values of more than 100 s (Konig pendulum damping, DIN 53 157) were formed.

The film showed no signs of change through staining, softening or separation from the substrate when tested for water resistance and solvent resistance in the same way as for the peroxide-cured coatings.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A hydrophilic polyurethane having a content (i) of olefinic double bonds (expressed as C=C, molecular weight=24) of at least 1.0% by weight and (ii) ethylene oxide units incorporated through polyethylene glycol of 20 to 80% by weight, which comprise the reaction product of a) 1.0 mole of a polyisocyanate component comprising at least one organic polyisocyanate with b) 0.3 to 2.5 moles of at least one $\beta,\gamma$-ethylenically unsaturated ether alcohol containing 5 to 29 carbon atoms, c) 0 to 1.0 mole of a component comprising at least one compound containing isocyanate-reactive groups and d) 0.25 to 0.85 moles of a polyethylene glycol component comprising at least one polyethylene glycol having a molecular weight of 1,300 to 5,000, in an NCO/OH equivalent ratio, based on starting components a) to d), of 0.7:1 to 1.2:1.

2. A water-dispersible mixture of radical-curable synthetic resins containing unsaturated groups comprising A) 50 to 95 parts by weight of at least one non-water-dispersible synthetic resin containing unsaturated groups and having a molecular weight Mn of 500 to 10,000 and B) 5 to 50 parts by weight of a polyurethane component which possesses sufficient hydrophilicity to ensure the dispersibility of the mixture of A) and B) in water, wherein said polyurethane component comprises at least one polyurethane according to claim 1.

3. The hydrophilic polyurethane of claim 1 wherein said $\beta,\gamma$-ethylenically unsaturated ether alcohol contains 5 to 14 carbon atoms.

4. The water-dispersible mixture of claim 2 wherein said polyurethane component comprises at least one polyurethane according to claim 3.

* * * * *